United States Patent
Yamamoto

(12)
(10) Patent No.: US 6,330,494 B1
(45) Date of Patent: Dec. 11, 2001

(54) ROBOT AND METHOD OF ITS ATTITUDE CONTROL

(75) Inventor: Takashi Yamamoto, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/485,184

(22) PCT Filed: Jun. 9, 1999

(86) PCT No.: PCT/JP99/03089

§ 371 Date: Apr. 18, 2000

§ 102(e) Date: Apr. 18, 2000

(87) PCT Pub. No.: WO99/64208

PCT Pub. Date: Dec. 16, 1999

(30) Foreign Application Priority Data

Jun. 9, 1998 (JP) .................................................. 10-161091

(51) Int. Cl.⁷ ............................ G05B 15/00; G05B 19/00
(52) U.S. Cl. ........................ 700/261; 700/245; 700/246; 700/247; 700/248; 700/249; 700/250; 700/257; 700/262; 700/275; 700/302; 700/253; 700/66; 700/260; 700/264; 901/1; 901/46; 901/47; 318/568.12; 318/800; 701/23
(58) Field of Search ..................................... 700/245, 246, 700/247, 248, 249, 250, 257, 261, 262, 66, 253, 275, 264, 302, 112; 704/9, 1, 10; 701/23; 901/1, 46, 47; 318/800, 805; 29/38.9, 563; 348/94

(56) References Cited

U.S. PATENT DOCUMENTS

| | | | |
|---|---|---|---|
| 3,911,613 | * 10/1975 | Morison et al. | 44/338 |
| 5,100,362 | * 3/1992 | Fogarty et al. | 446/272 |
| 5,172,806 | * 12/1992 | Mickelberg | 206/756 |
| 5,289,916 | * 3/1994 | Mickelberg | 84/661 |
| 5,349,277 | * 9/1994 | Takahashi et al. | 318/568.12 |
| 5,606,494 | * 2/1997 | Oshima et al. | 323/280 |
| 5,626,505 | * 5/1997 | Cheng | 446/278 |

FOREIGN PATENT DOCUMENTS

| | | | |
|---|---|---|---|
| 63-191582 | 8/1988 | (JP) . | |
| 2-8498 | 1/1990 | (JP) | A63H/17/26 |
| 6-198582 | 7/1994 | (JP) | B25J/5/00 |
| 6-31658 | 8/1994 | (JP) | B25J/5/00 |
| 7-205085 | 8/1995 | (JP) | B25J/19/02 |
| 8-71967 | 3/1996 | (JP) | B25J/9/16 |
| 9-142347 | 3/1997 | (JP) | B62D/61/12 |
| 10-113886 | 5/1998 | (JP) | B25J/5/00 |

OTHER PUBLICATIONS

Heiserman, K–9 Robot, 1979, Internet, p 1.*

Sony, Robot–Pet Aibo, June 1, 1999, Internet.*

Agah et al., Architectural and Functional Specifications for a Robot Kitten "Robokoneko" to be Controlled by a 10,000 Evolved Neural Net Module Artificial Brain, 1993–2001, Internet.*

* cited by examiner

*Primary Examiner*—William A. Cuchlinski, Jr.
*Assistant Examiner*—McDieunel Marc
(74) *Attorney, Agent, or Firm*—Ronald P. Kananen; Rader, Fishman & Grauer

(57) ABSTRACT

A robot system wherein the CPU 102 detects that the posture of the system main body has been shifted from the normal posture into an abnormal posture on the basis of the acceleration information obtained as detection output of the acceleration sensor 41. Then, the body restores the normal posture by a playback technique for controlling various drivers 3D through 7D, using route planning data stored in advance in the memory 101 or restoring the normal posture from a falling posture.

15 Claims, 18 Drawing Sheets

HEAD SIDE DOWN

RIGHT SIDE DOWN

LEFT SIDE DOWN

TAIL SIDE DOWN

IMAGE FOR NORMAL POSTURE

IMAGE FOR ABNORMAL POSTURE
(UPSIDE DOWN)

IMAGE FOR ABNORMAL POSTURE
(RIGHT SIDE DOWN)

IMAGE FOR ABNORMAL POSTURE
(LEFT SIDE DOWN)

ROBOT AND METHOD OF ITS ATTITUDE CONTROL

TECHNICAL FIELD

This invention relates to a robot apparatus adapted to restore its normal posture by itself from an abnormal posture such as a tumbling posture and a method of controlling the posture of such a robot apparatus.

BACKGROUND ART

Various robots with different mechanical features are known to date including tired automotive robots adapted to move by means of revolving tires and two-legged or four-legged self-supporting walkable robots.

A robot of this type is typically provided with a mechanical system comprising actuators having a predetermined degree of freedom, sensors arranged at respective positions to detect predetermined physical quantities and a control section having microcomputers for controlling and driving the actuators individually to make the robot move by itself and/or perform a predetermined action in a coordinated manner. Such a robot is produced by assembling components including a trunk, legs and a head to make them show predetermined mutual relationships.

Walkable robots having two or more than two legs include those typically showing a profile resembling a cat or a dog and having four legs each of which is provided with a predetermined number of joints. The joints of the legs of such a robot can be controlled by recording and reproducing positional information and velocity information according to instructions or by carrying out arithmetic operations, using a kinetic model along with positional information and velocity information.

If controlled according to instructions or on the basis of a kinetic model, the motion of a known robot is designed on the basis of certain assumptions concerning the environment of the activity of the robot that is conceivable to the designer. Therefore, in an environment where those assumptions do not hold true, the robot can be forced to take an unintended posture, which by turn damages the function and/or the structure of the robot, if partly, and eventually make it go out of order. In some cases, the robot can damage the environment.

DISCLOSURE OF THE INVENTION

In view of the above identified circumstances, it is therefore an object of the present invention to provide means for effectively preventing a robot from being damaged or causing an accident if operated in an abnormal posture such as a tumbling posture.

Another object of the present invention is to provide a robot apparatus that can restore its normal posture by itself from an abnormal posture such as a tumbling posture and a method of controlling the posture of a robot.

According to the present invention, there is provided a robot apparatus comprising posture detection means for detecting the posture of the apparatus main body and outputting the result of the detection, posture determination means for determining if the apparatus main body is taking a predetermined posture or not on the basis of said result of the detection and posture modification means for modifying the posture of the apparatus main body when said posture determination means determines that the apparatus main body is taking the predetermined posture.

According to the present invention, there is also provided a method of controlling the posture of a robot apparatus comprising steps of detecting the posture of the apparatus main body, determining if the apparatus main body is taking a predetermined posture or not on the basis of the result of the detection and modifying the posture of the apparatus main body when it is determined that the apparatus main body is taking the predetermined posture.

BEST MODE FOR CARRYING OUT THE INVENTION

Now, the present invention will be described by referring to the accompanying drawings that illustrate a best mode of carrying out the invention.

Figure 1:
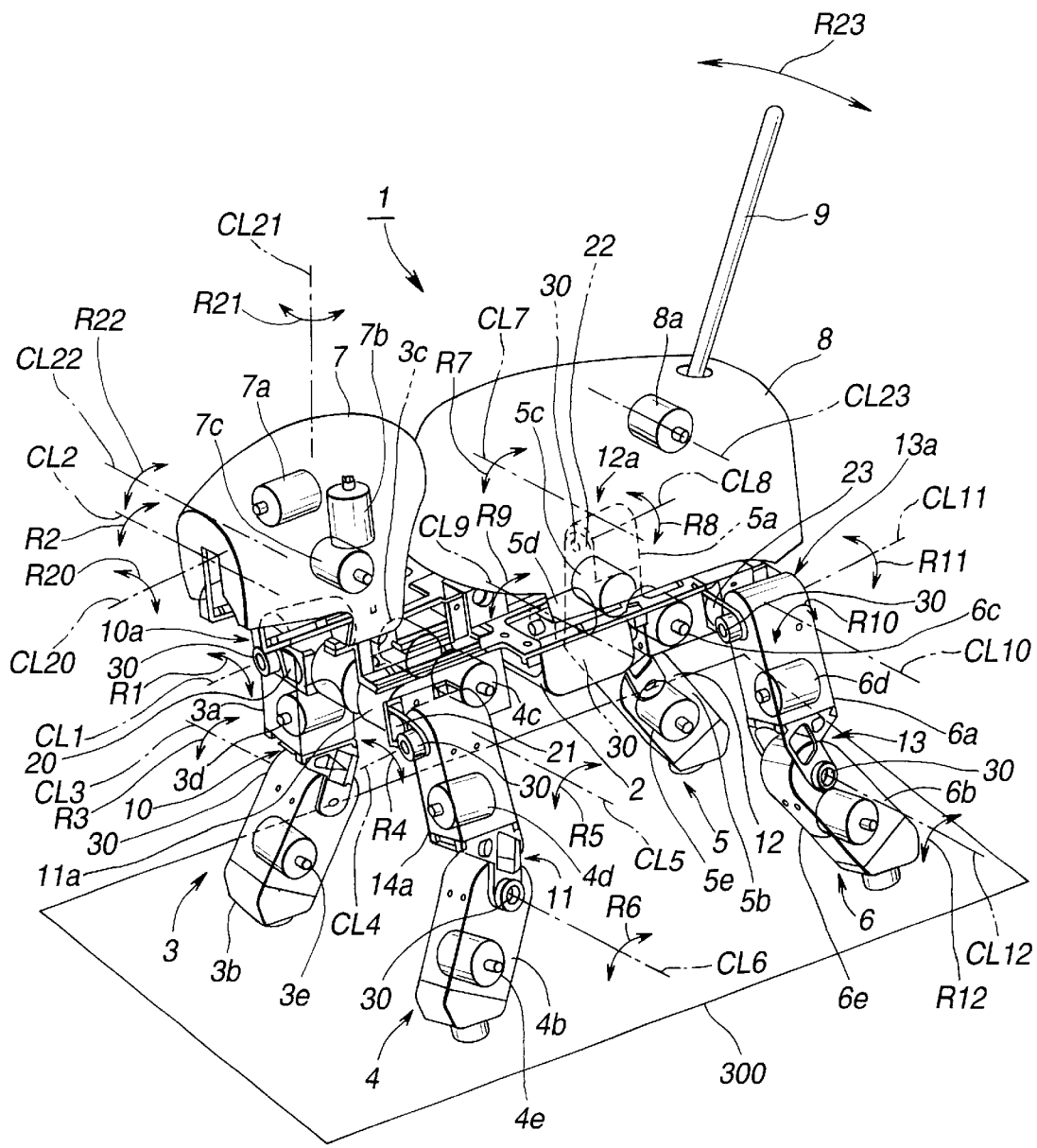
FIG. 1 is a schematic perspective view of a multi-legged walkable robot, illustrating its structure.

FIG. 1 is a schematic perspective view of a multi-legged walkable robot 1 according to the invention.

The multi-legged walkable robot 1 is a multi-joint type robot having four legs and showing a profile resembling an animal. The multi-legged walkable robot 1 comprises a main body 2, a right foreleg 3, a left foreleg 4, a right hind leg 5, a left hind leg 6, a head 7, a trunk section 8, a tail 9.

The multi-joint type robot 1 has joints 10, 11, 12, 13 respectively for the right foreleg 3, the left foreleg 4, the right hind leg 5 and the left hind leg 6, each of which joints is provided with a brake mechanism 30. Thus, the operator can give positional information on the relative position of any of the moving parts (legs) of the right foreleg 3, the left foreleg 4, the right hind leg 5 and the left hind leg 6 to the robot, utilizing the action of the brake mechanism 30 and by means of a direct teaching method.

The main body 2 has brackets 20, 21, 22, 23 respectively for the right foreleg 3, the left foreleg 4, the right hind leg 5 and the left hind leg 6. The head 7 is located at the front of the main body 2 and the trunk section 8 is located behind the head 7. The tail 9 is projecting upward from the trunk section 8.

Now, the components of the robot will be sequentially described in terms of the main body 2.

Firstly, the right foreleg 3 includes an upper leg 3a, a lower leg 3b, a bracket 20, joints 10, 10a, a brake mechanism 30 and servo motors 3c, 3d, 3e along with other components.

The upper leg 3a is linked to the bracket 20 at the upper end thereof and rotatable around central axis CL1 in the direction of arrow R1. The upper leg 3a and the lower leg 3b are linked by means of the joint 10. The servo motor 3c is contained in the main body 2 and adapted to drive the bracket 20 to rotate around central axis CL2 in the direction of arrow R2. The servo motor 3d is adapted to drive the upper leg 3a around the central axis CL1 in the direction of arrow R1. The servo motor 3e is adapted to drive the lower leg 3b around central axis CL3 in the direction of arrow R3 relative to the upper leg 3a.

The left foreleg 4 includes an upper leg 4a, a lower leg 4b, a bracket 21, joints 11, 11a, a brake mechanism 30 and servo motors 4c, 4d, 4e along with other components.

The upper leg 4a is linked to the bracket 21 at the upper end thereof and rotatable around central axis CL4 in the direction of arrow R4. The upper leg 4a and the lower leg 4b are linked by means of the joint 11. The servo motor 4c is contained in the main body 2 and adapted to drive the bracket 21 to rotate around central axis CL5 in the direction of arrow R5. The servo motor 4d is adapted to drive the upper leg 4a around the central axis CL4 in the direction of arrow R4. The servo motor 4e is adapted to drive the lower leg 4b around central axis CL6 in the direction of arrow R6 relative to the upper leg 3a.

The right hind leg 5 includes an upper leg 5a, a lower leg 5b, a bracket 22 joints 12, 12a, a brake mechanism 30 and servo motors 5c, 5d, 5e along with other components.

The upper leg 5a is linked to the bracket 22 at the upper end thereof. The servo motor 5c is adapted to drive the bracket 22 to rotate around central axis CL7 in the direction of arrow R7. The servo motor 5d is adapted to drive the upper leg 5a to rotate around central axis CL8 in the direction of arrow R8. The servo motor 5e is adapted to drive the lower leg 5b around central axis CL9 in the direction of arrow R9.

The left hind leg 6 includes an upper leg 6a, a lower leg 6b, a bracket 23 joints 13, 13a, a brake mechanism 30 and servo motors 6c, 6d, 6e along with other components.

The servo motor 6c is adapted to drive the bracket 23 to rotate around central axis CL10 in the direction of arrow R10. The servo motor 6d is adapted to drive the upper leg 6a to rotate around central axis CL11 in the direction of arrow R11. The servo motor 6e is adapted to drive the lower leg 6b around central axis CL12 in the direction of arrow R12.

Thus, each of the right foreleg 3, the left foreleg 4, the right hind leg 5 and the left hind leg 6 comprises components having a degree of freedom of 3 so that it can be driven by servo motors to rotate around a plurality of axes.

The head 7 comprises servo motors 7a, 7b, 7c, of which the servo motor 7a is adapted to drive the head 7 to swing around central axis CL20 in the direction of arrow R20. The servo motor 7b is adapted to drive the head 7 to swing around central axis CL21 in the direction of arrow R21. The servo motor 7c is adapted to drive the head 7 to swing around central axis CL22 in the direction of arrow R22. Thus, the head 7 has a degree of freedom of 3.

The trunk section 8 comprises a servo motor 8a, which is adapted to drive the tail 9 to swing around central axis CL23 in the direction of arrow R23.

Figure 2:
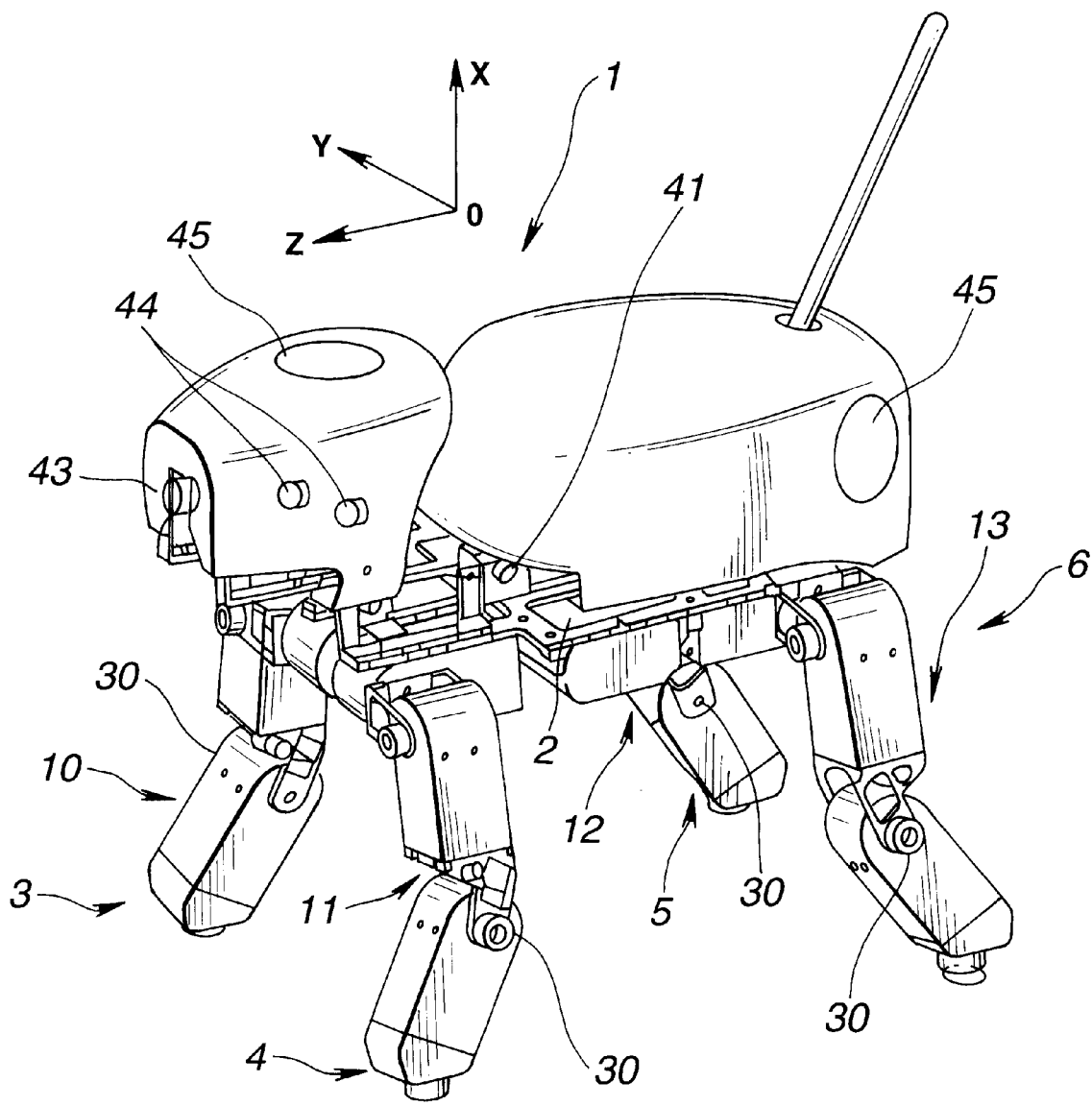
FIG. 2 is a schematic perspective view of the multi-legged walkable robot of FIG. 1, illustrating the arrangement of various sensors including acceleration sensors to be used for detecting a falling posture.

As shown in FIG. 2, the main body 2 of the multi-joint type robot 1 contains a 3-axial (x, y, z) acceleration sensor 41 that can detect the acceleration and the angular velocity of the main body 2 in any posture. Additionally, the head 7 is provided with a CCD camera 43 and microphones 44. Still additionally, the head, the legs, the abdomen, the throat, the sitting and the rail are provided with respective contact sensors 45. The detection output of each of the sensors is transmitted to CPU (central processing unit) 102 arranged in control section 100 of the multi-joint type robot 1 by way of a bus 103.

Figure 3:
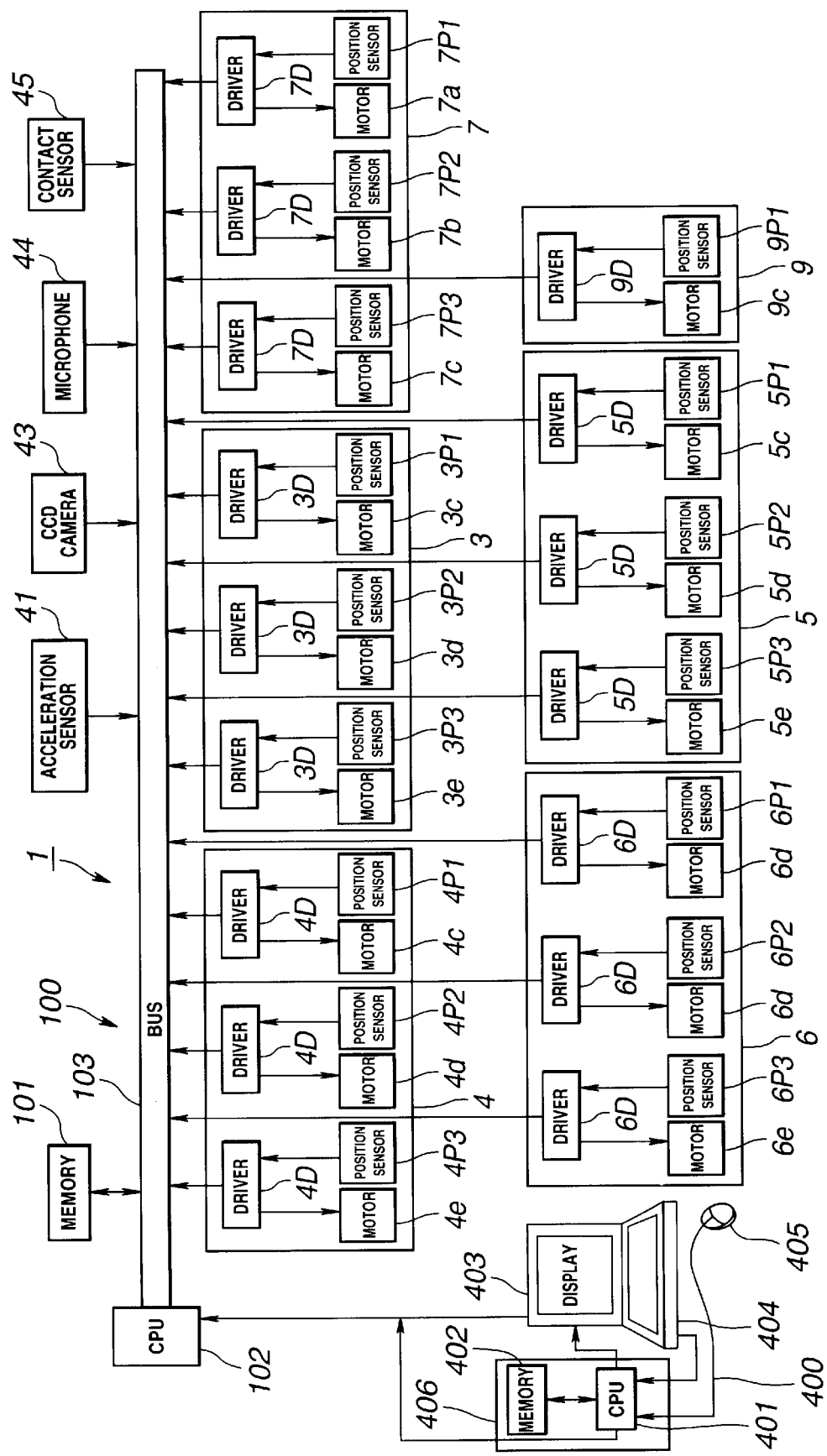
FIG. 3 is a schematic block diagram of the control system of the multi-legged walkable robot of FIG. 1.

FIG. 3 is a schematic block diagram of the multi-joint type robot 1, illustrating the wired connection of the control section 100, the servo motors for driving the respective joints of the right foreleg 3, the left fore leg 4, the right hind leg 5, the left hind leg 6, the head 7 and the tail 9 and the respective position sensors.

The control section 100 comprises a memory 101 and a CPU (central control unit) 102 and, as shown in FIG. 3, bus 103 of the CPU 102 is connected to the right foreleg 3, the left fore leg 4, the right hind leg 5, the left hind leg 6, the head 7 and the tail 9.

The right foreleg 3 comprises the above listed servo motors 3c, 3d, 3e and position sensors 3P1, 3P2, 3P3. The servo motors 3c, 3d, 3e are connected to respective drivers 3D and the position sensors 3P1, 3P2, 3P3 are also connected to the drivers 3D respectively. The drivers 3D are connected to the bus 103.

Similarly, the servo motors 4c, 4d, 4e and the position sensors 4P1, 4P2, 4P3 of the left foreleg 4 are connected to respective drivers 4D and the servo motors 5c, 5d, 5e and the position sensors 5P1, 5P2, 5P3 of the right hind leg 5 are connected to respective drivers 5D, whereas the servo motors 6c, 6d, 6e and the position sensors 6P1, 6P2, 6P3 of the left hind leg 6 are connected to respective drivers 6D.

The servo motors 7a, 7b, 7c and the position sensors 7P1, 7P2, 7P3 of the head 7 are connected to respective drivers 7D. The servo motor 9a and the position sensor 9P1 of the sitting 9 are connected to drivers 9D.

The position sensors 3P1, 3P2, 3P3 of the right foreleg 3, the position sensors 4P1, 4P2, 4P3 of the left foreleg 4, the position sensors 5P1, 5P2, 5P3 of the right hind leg 5 and the position sensors 6P1, 6P2, 6P3 of the left foreleg 6 are designed to collect positional information for the respective positions. A rotary angle sensor such as a potentiometer may be used for each of the position sensors for the purpose of detecting the angle of the joint for which it is responsible. Upon receiving the positional information obtained by the position sensors 3P1 through 6P3, which may be so many rotary angle sensors, the CPU 102 issues a command to each of the related drivers on the basis of the positional information fed back to it. Then, each of the related driver servo-controls the corresponding servo motor according to the command given by the CPU 102 and drives the servo motor to rotate to the position indicated by the command.

FIGS. 4 through 7 are simplified illustrations of the multi-legged walkable robot 1 of FIG. 1. The trunk section 8 carries the head 7, the right foreleg 3, the left foreleg 4, the right hind leg 5 and the left hind leg 6. The legs 3 through 5 are provided with respective joints 10, 11, 12, 13, 30, 30, 30, 30.

Figure 4:
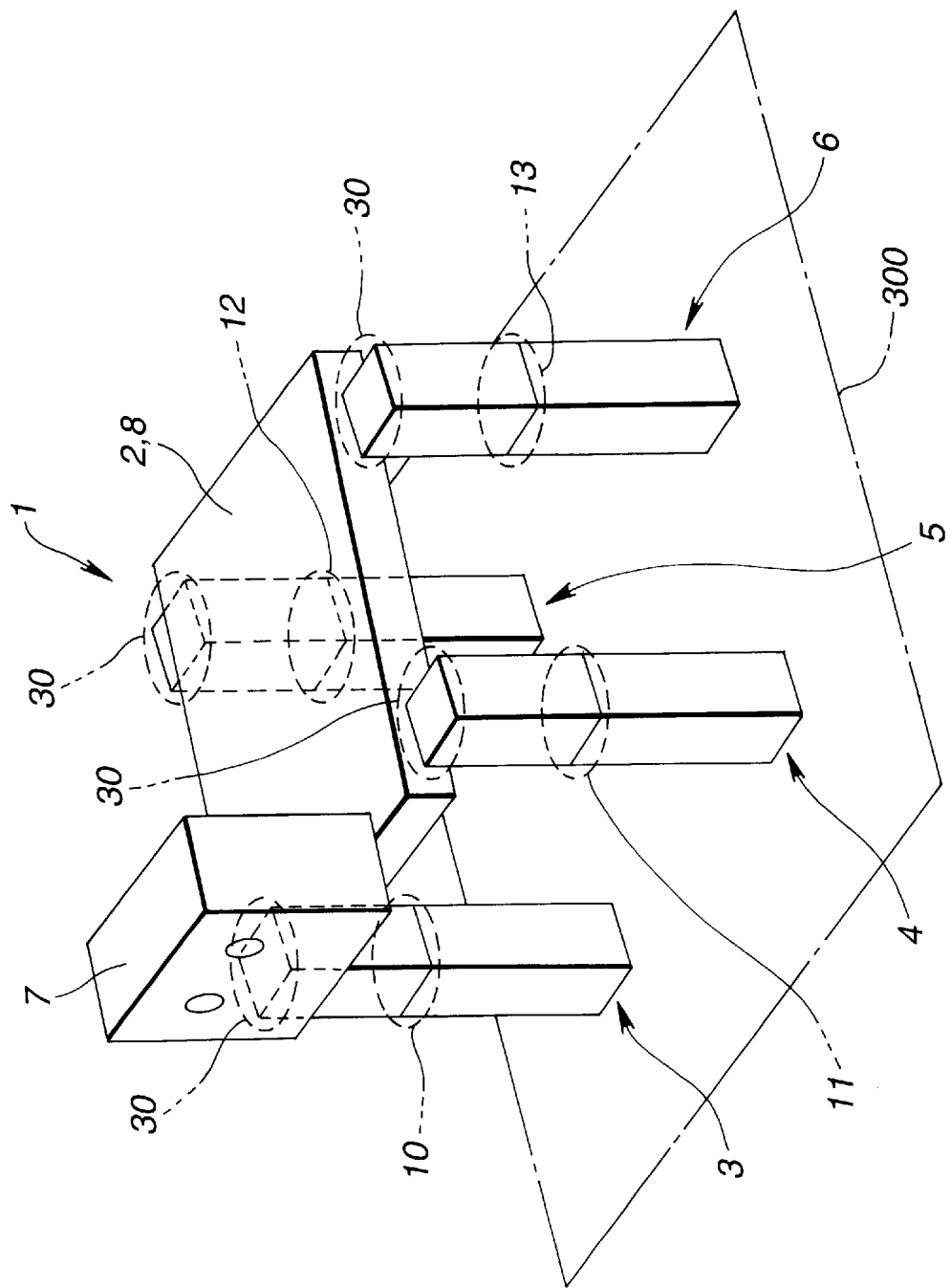
FIG. 4 is a schematic perspective view of the multi-legged walkable robot of FIG. 1, illustrating its basic posture.
Figure 5:
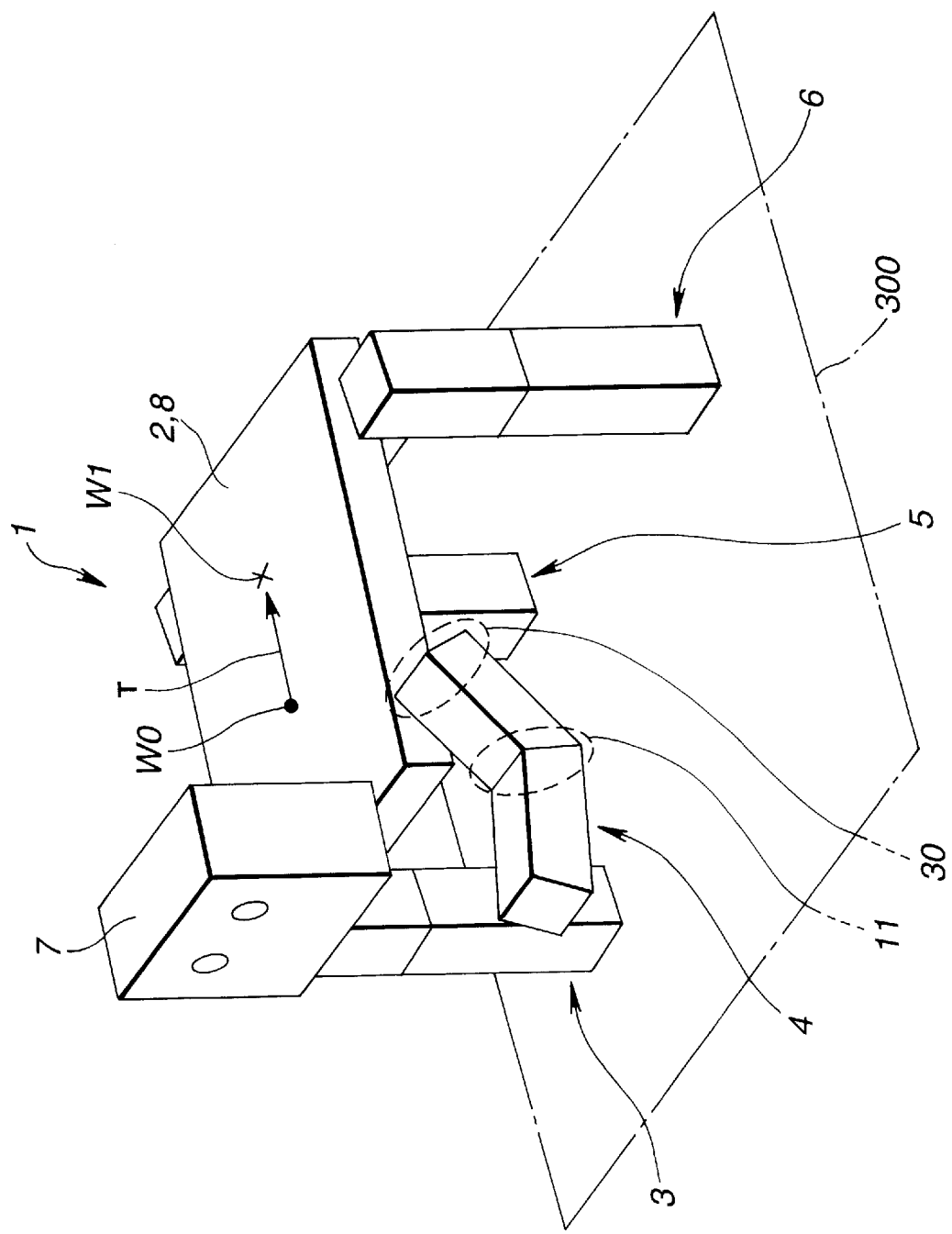
FIG. 5 is a schematic perspective view of the multi-legged walkable robot of FIG. 1, illustrating a posture where the left foreleg is raised from the basic posture.
Figure 6:
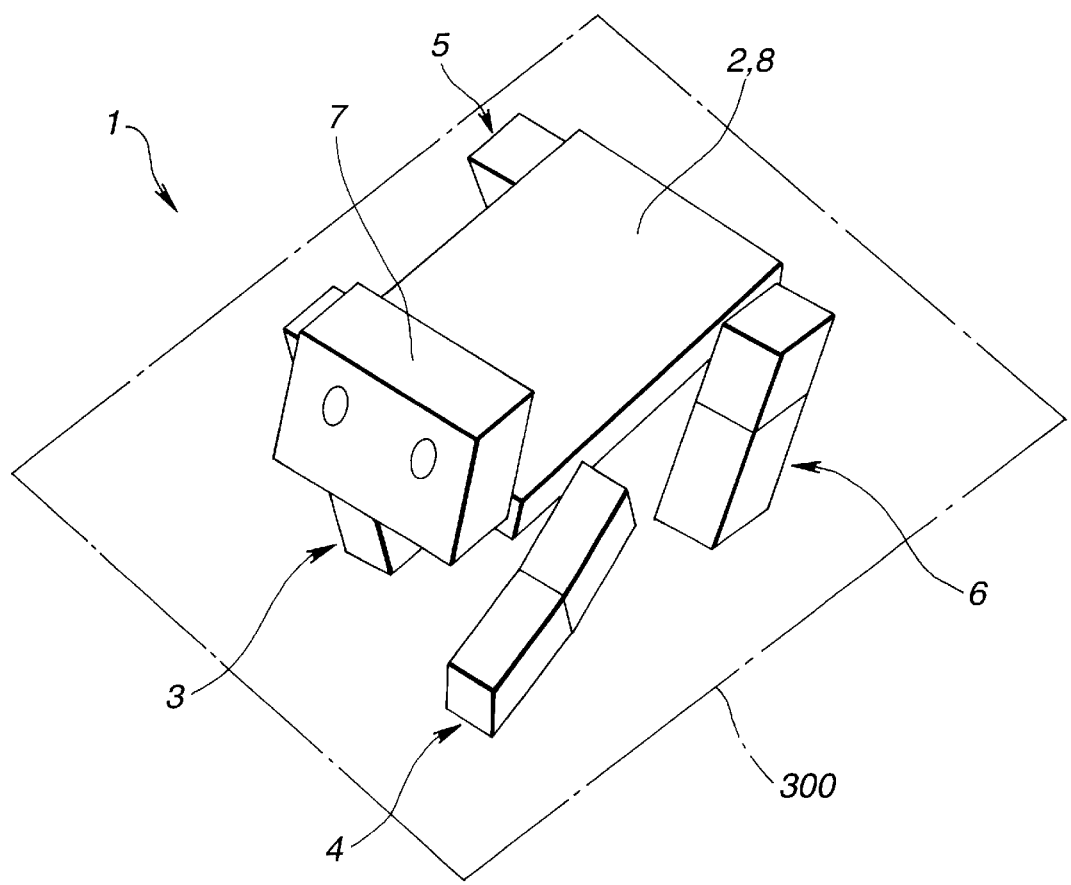
FIG. 6 is a schematic perspective view of the multi-legged walkable robot of FIG. 1, illustrating a posture where the robot loses its balance.

FIG. 4 shows the basic posture of the multi-legged walkable robot 1, where the right foreleg 3, the left foreleg 4, the right hind leg 5 and the left hind leg 6 are all straightened. FIG. 5 shows that the joint 11 and the joint 30 of the left foreleg 4 are made to move from the basic posture of FIG. 4.

The right foreleg 3, the left foreleg 4, the right hind leg 5 and the left hind leg 6 are all made to contact the ground surface 300 in FIG. 4. On the other hand, the left foreleg 4 is thrown forward to take the posture of FIG. 5 as the joins 11, 30 of the left foreleg 4 are made to move.

When the operator determines the angle of the joint 11 of the left elbow of the left foreleg 4 and the angle of the joint 30 of the left shoulder of the multi-legged walkable robot 1, he or she carries out an operation of editing a motion pattern of the multi-legged walkable robot in the following manner.

In the editing operation of giving a motion to both of the joints 11, 30 of the multi-legged walkable robot 1 to make them move from the positions of FIG. 4 to the positions shown in FIG. 5, the position of the center of gravity W0 of the multi-legged walkable robot 1 in the posture of FIG. 5 is calculated by means of the software of external editing commander computer 400 of the control section 100 as shown in FIG. 3 and then at least the angles of the joints of one of the right foreleg 3, the right hind leg 5 and the left hind leg 6 are automatically determined in such a way that the multi-legged walkable robot 1 would not fall down from the position of the center of gravity W0. In this operation, commands are issued from the external editing commander computer 400 to the CPU 102 of the control section and the CPU 102 by turn issues a motion command to each of the servo motors of the related leg.

The weights of the components of the multi-legged walkable robot 1 including the trunk section 8, the main body 2, the right foreleg 3, the left foreleg 4, the right hind leg 5, the left hind leg 6 and the head 7 are stored in advance in memory 402 of the external editing commander computer 400 so that the position of the center of gravity W0 of the multi-legged walkable robot 1 in the posture of FIG. 4 can be calculated on the stored weight data.

Now, a technique that can be used for editing a motion pattern of the multi-legged walkable robot 1 will be described by referring to FIG. 8.

Figure 8:
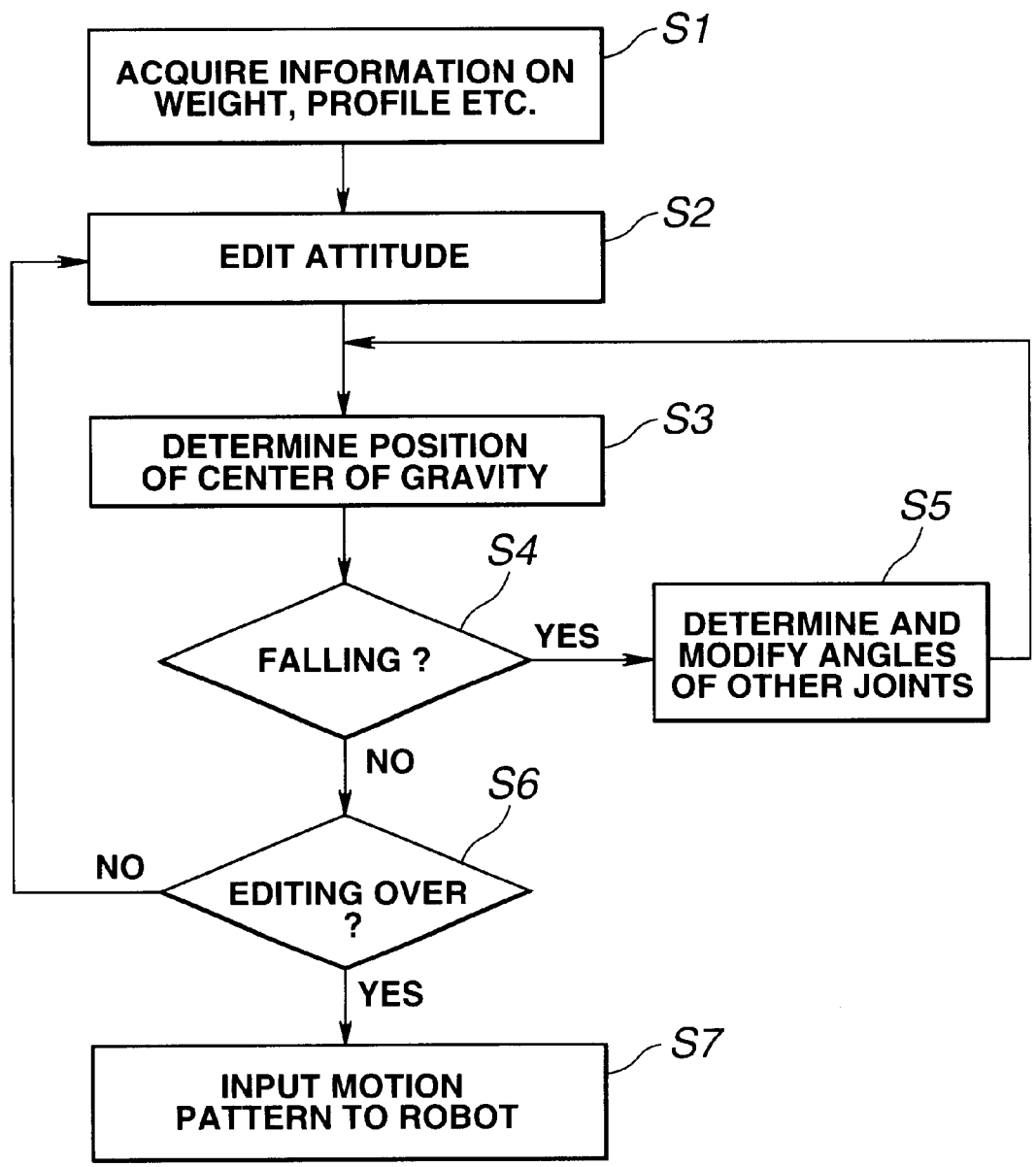
FIG. 8 is a flow chart illustrating a method of editing a motion pattern of the multi-legged walkable robot of FIG. 1.

Referring to FIG. 8, before Step S 1, data including the weights and the profiles of the components of the multi-legged walkable robot 1 are stored in advance in the memory 101. More specifically, data including the weights and the profiles of the components including the main body 2, the trunk section 8, the head 7, the right foreleg 3, the left foreleg 4, the right hind leg 5, the left hind leg 6 and the tail 9 are stored in the memory 101 and the data are sent from the memory 101 to the memory 402 of the external editing commander computer 400. This processing operation of acquiring data on the weights and the profiles is performed in Step S1.

Then, the processing operation of editing the posture of the multi-legged walkable robot 1 starts in Step S2. In other words, instructions are given to the joints 11 and 30 so as to make them move until the left foreleg 4 is thrown forward to take the posture as shown in FIG. 5. However, if simply the left foreleg 4 is thrown forward, the center of gravity is shifted to the side of the left foreleg 4 and the multi-legged walkable robot 1 may fall left forward.

Figure 7:
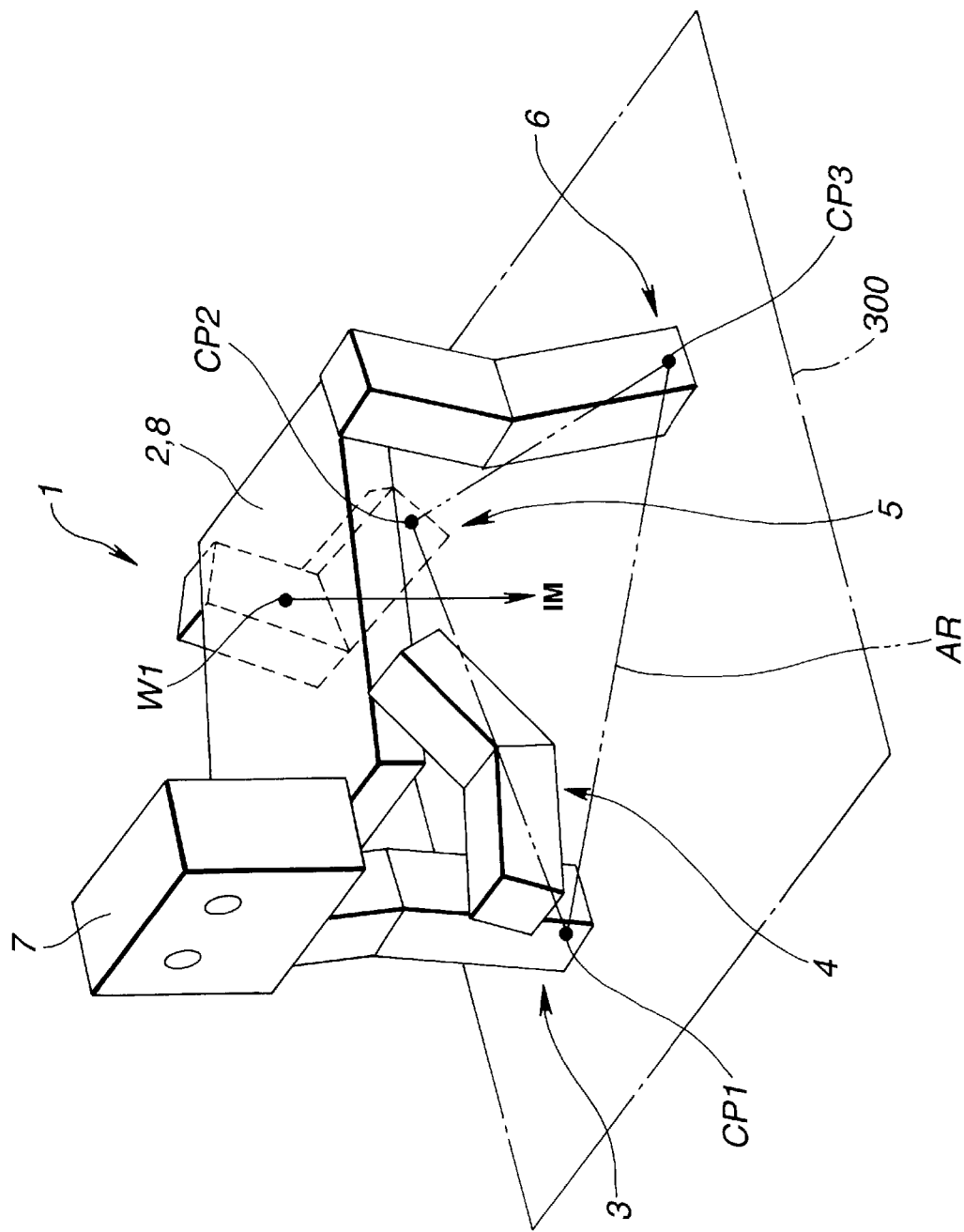
FIG. 7 is a schematic perspective view of the multi-legged walkable robot of FIG. 1, illustrating a posture where the robot does not lose its balance.

Thus, in order to prevent the multi-legged walkable robot 1 from falling, once the joints 11, 30 are moved to make the left foreleg 4 thrown forward as shown in FIG. 5, the external editing commander computer 400 of the control section 100 in FIG. 3 determines by calculation new center of gravity W1 that is located behind the current center of gravity W0 along line T in FIG. 5 in terms of the main body 2 and the trunk section 8 and obtains data for the calculated new center of gravity W1. In order to shift the center of gravity from W0 to W1, the joints 10, 12, 13 and the joints 30, 30, 30 of the right foreleg 3, the right hind leg 5 and the left hind leg 6 should be moved in a manner as shown in FIG. 7. These motions will be made under the control of the external editing commander computer 400.

In order to make the multi-legged walkable robot 1 well-balanced, the motions of the joints 10, 12, 13 and the joints 30, 30, 30 of the right foreleg 3, the right hind leg 5 and the left hind leg 6 are preferably determined by taking Steps S4 and S5 in FIG. 8. In other words, the projected point IM of the new center of gravity W1 on the ground surface 300 should be found within triangular center of gravity safety area AR shown in FIG. 7. The center of gravity safety area AR is defined by the triangle having its three corners at the grounded point CP1 of the right foreleg 3, the grounded point CP2 of the right hind leg 5 and the grounded point CP3 of the left hind leg 6.

So long as the projected IM of the center of gravity W1 is constantly located within the safety area AR, the joints 10, 12, 13 and the joints 30, 30, 30 of the right foreleg 3, the right hind leg 5 and the left hind leg 6 can be moved without causing the multi-legged walkable robot 1 to fall. Then, a stable posture can be selectively taken with a minimal amount of motion.

Now, it will be clear by comparing FIG. 5 and FIG. 7 that, when the multi-legged walkable robot 1 is made to throw its left foreleg 4 forward, its center of gravity is shifted from W0 to W1 and, at the same time, the hind legs 5, 6 are bent slightly to take a somewhat crouched posture. After determining the new center of gravity by calculation in Step S3, the multi-legged walkable robot 1 is observed to see if it is going to fall or not in Step S4. If it is going to fall, the external editing commander computer 400 determines necessary motions of other appropriate joints (table of angles) in Step S4 and returns to Step S3, where it determines a new center of gravity for another time.

If, on the other hand, it is found in Step S4 that the multi-legged walkable robot 1 is not going to fall, the external editing commander computer 400 advances to Step S6, where it terminates the operation of editing the motion pattern of the multi-legged walkable robot 1. When the editing operation is terminated, the external editing commander computer 400 inputs the edited and finalized motion pattern to the CPU 102 of the multi-legged walkable robot 1 (Step S7).

The control section 100 constantly watching the part of the multi-legged walkable robot 1 to detect any falling posture thereof on the basis of the acceleration information AccXt, AccYt, Acc Zt along the three axes (x, y, z) obtained by the 3-axial (x, y, z) acceleration sensor 41 contained in the main body 2. Whenever the control section 100 detects a falling posture, it makes the robot restore the normal posture.

Figure 9:
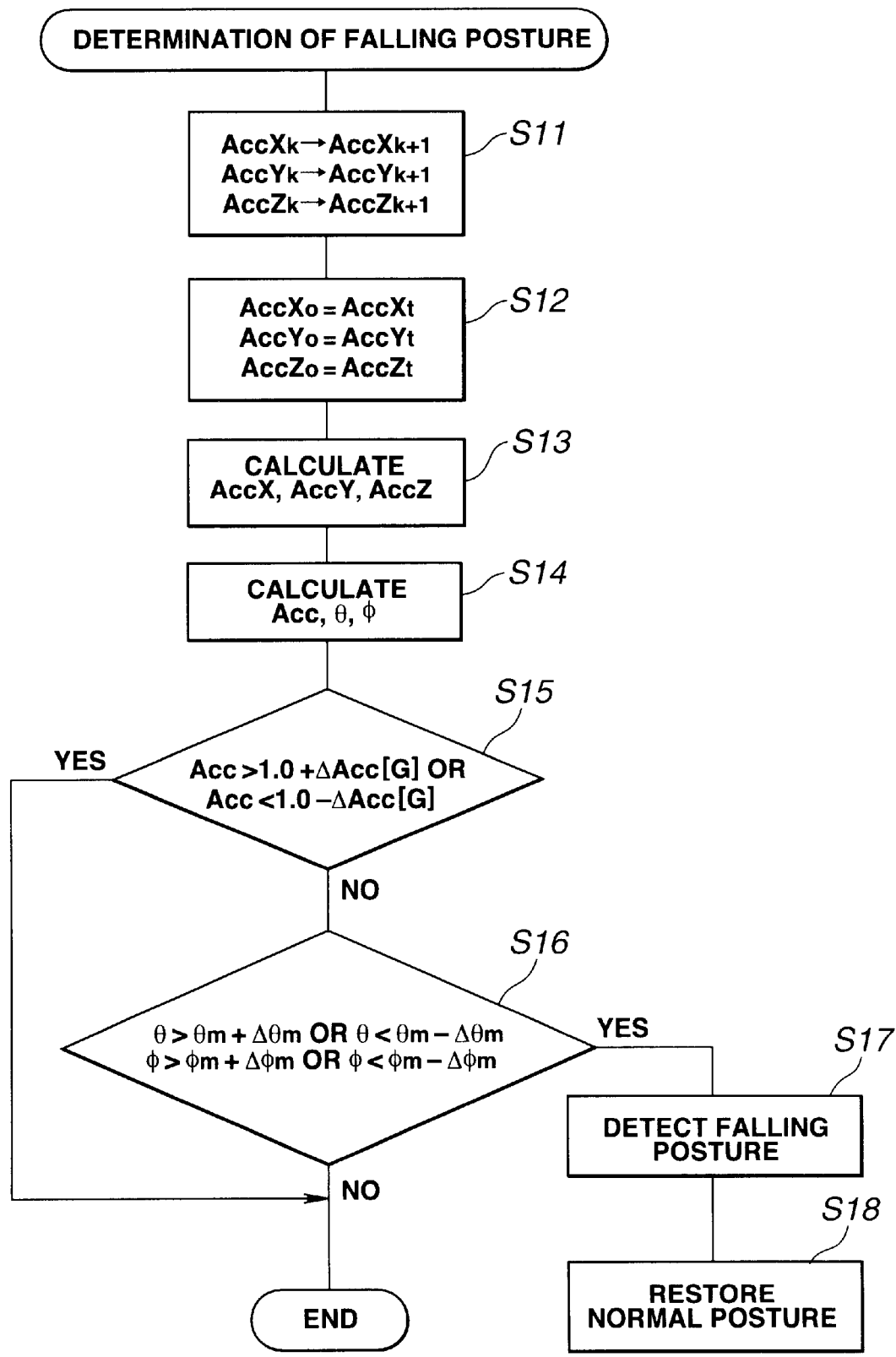
FIG. 9 is a flow chart illustrating an algorithm for determining the presence of a falling posture by means of the control section of the multi-legged walkable robot of FIG. 1.

FIG. 9 is a flow chart illustrating an algorithm for determining the presence of a falling posture by means of the control section 100 of the multi-legged walkable robot 1.

Referring to FIG. 9, the control section 100 detects any falling posture on the basis of the acceleration information AccXt, AccYt, AccZt along the three axis (x, y, z) detected by the acceleration sensor 41 in a manner as described below.

For determining the presence of a falling posture, in Step S11, the control section 100 discards the oldest acceleration information AccXn, AccYn, AccZn in the data buffer and updates the time tag of the data in the data buffer. In the multi-legged walkable robot 1, the buffer number of the data buffer is 50 for each of the three axes.

$$AccXk \rightarrow AccXk+1(k=0 \sim n-1) \quad \text{(formula 1)}$$

$$AccYk \rightarrow AccYk+1(k=0 \sim n-1) \quad \text{(formula 2)}$$

$$AccZk \rightarrow AccZk+1(k=0 \sim n-1) \quad \text{(formula 3)}$$

Then, in Step S12, the acceleration information AccXt, AccYt, AccZt along the three axes (x, y, z) obtained by the acceleration sensor 41 is stored in the data buffer. The data updating rate of this multi-legged walkable robot 1 is 10 ms.

$$AccXo \rightarrow AccXt \quad \text{(formula 4)}$$

$$AccYo \rightarrow AccYt \quad \text{(formula 5)}$$

$$AccZo \rightarrow AccZt \quad \text{(formula 6)}$$

Then, in Step S13, the control section 100 calculates temporal average accelerations AccX, AccY, AxxZ along the three axes (x, y, z) from the data in the data buffer.

$$AccX = \Sigma AccXk/n(k=0 \sim n) \quad \text{(formula 7)}$$

$$AccY = \Sigma AccYk/n(k=0 \sim n) \quad \text{(formula 8)}$$

$$AccZ = \Sigma AccZk/n(k=018\ n) \quad \text{(formula 9)}$$

Figure 10A:
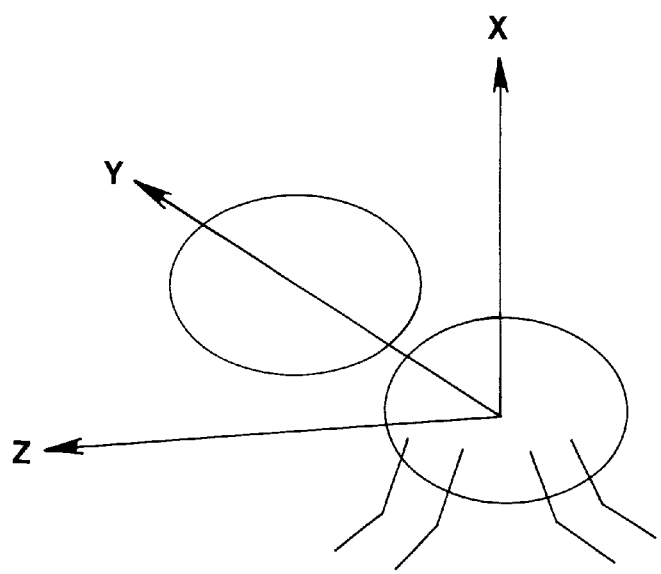
FIGS. 10A and 10B are schematic illustrations of the relationship of the argument $\theta$ of the average acceleration Acc address the Y-Z plane and the angle $\phi$ of the component of the average acceleration projected on the Y-Z plane and the Z-axis.
Figure 10B:
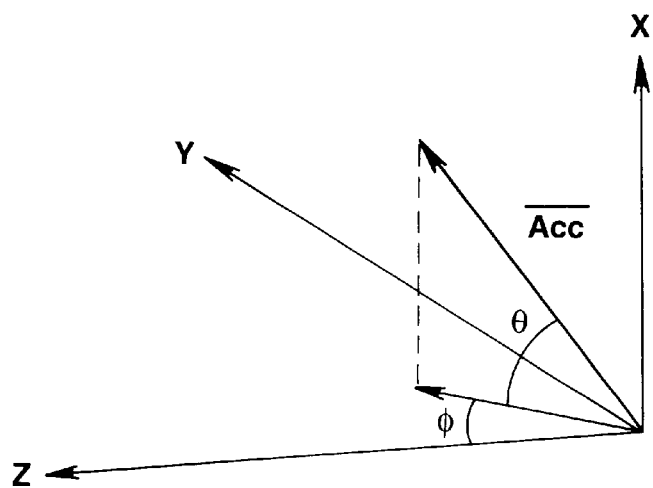

Then, in Step S14, the argument $\theta$ of the average acceleration Acc and the Y-Z plane and the angle $\phi$ of the component of the average acceleration projected on the Y-Z plane and the Z-axis are determined (see FIGS. 10A and 10B).

$$Acc = (AccX^2 + AccY^2 + AccZ^2)^{1/2} \quad \text{(formula 10)}$$

$$\theta = \mathrm{asin}(AccY/((AccY^2 + AccZ^2)^{1/2})) \quad \text{(formula 11)}$$

$$\phi = \mathrm{asin}(AccZ/Acc) \quad \text{(formula 12)}$$

In Step S15, it is determined if the average acceleration (Euclidian distance) Acc is found within the tolerable range ($\Delta$Acc) or not. If the average acceleration Acc is not found within the tolerable range, the control section 100 moves out of the falling posture determining process because the robot may be subjected to a large external force, trying to lift it.

$$Acc > 1.0 + \Delta Acc[G] \text{ or } Acc < 1.0 - \Delta Acc[G] \rightarrow \text{exemption from processing operation} \quad \text{(formula 13)}$$

Then, in Step S16, the control section 100 compares the argument $\theta$ of the average acceleration Acc and the Y-Z plane and the angle $\phi$ of the component of the average acceleration projected on the Y-Z plane and the Z-axis with the template argument $\theta m$ of the average acceleration Acc and the Y-Z plane and the template angle $\phi m$ of the component of the average acceleration projected on the Y-Z plane and the Z-axis that are template data for the current posture. If the differences are within the respective tolerable ranges ($\Delta\theta m$, $\Delta\phi m$), the control section 100 determines that the current posture is normal. If, on the other hand, the differences are out of the respective tolerable ranges, it determines that the robot is falling or in an abnormal posture. When, the robot is walking, $\theta = -\pi/2$ and $\phi$=arbitrary.

$$\theta > \theta m + \Delta\theta m \text{ or } \theta < \theta m - \Delta\theta m \quad \text{(formula 14)}$$

$$\phi > \phi m + \Delta\phi m \text{ or } \phi < \phi m - \Delta\phi m \quad \text{(formula 15)}$$

Since a falling phenomenon is a very low frequency phenomenon relative to the sampling frequency of angular velocity, the use of data buffer for determining averages over a period of time can reduce the possibility of errors due to noises in determining a falling posture. Additionally, this technique provides the advantage of a low load if compared with the use of a low pass digital filter for processing data.

If a falling posture is detected by the above processing operation of determining a falling posture (Step S17). The processing operation proceeds to Step S18 to restore the normal posture in a manner as described below.

Figure 11:
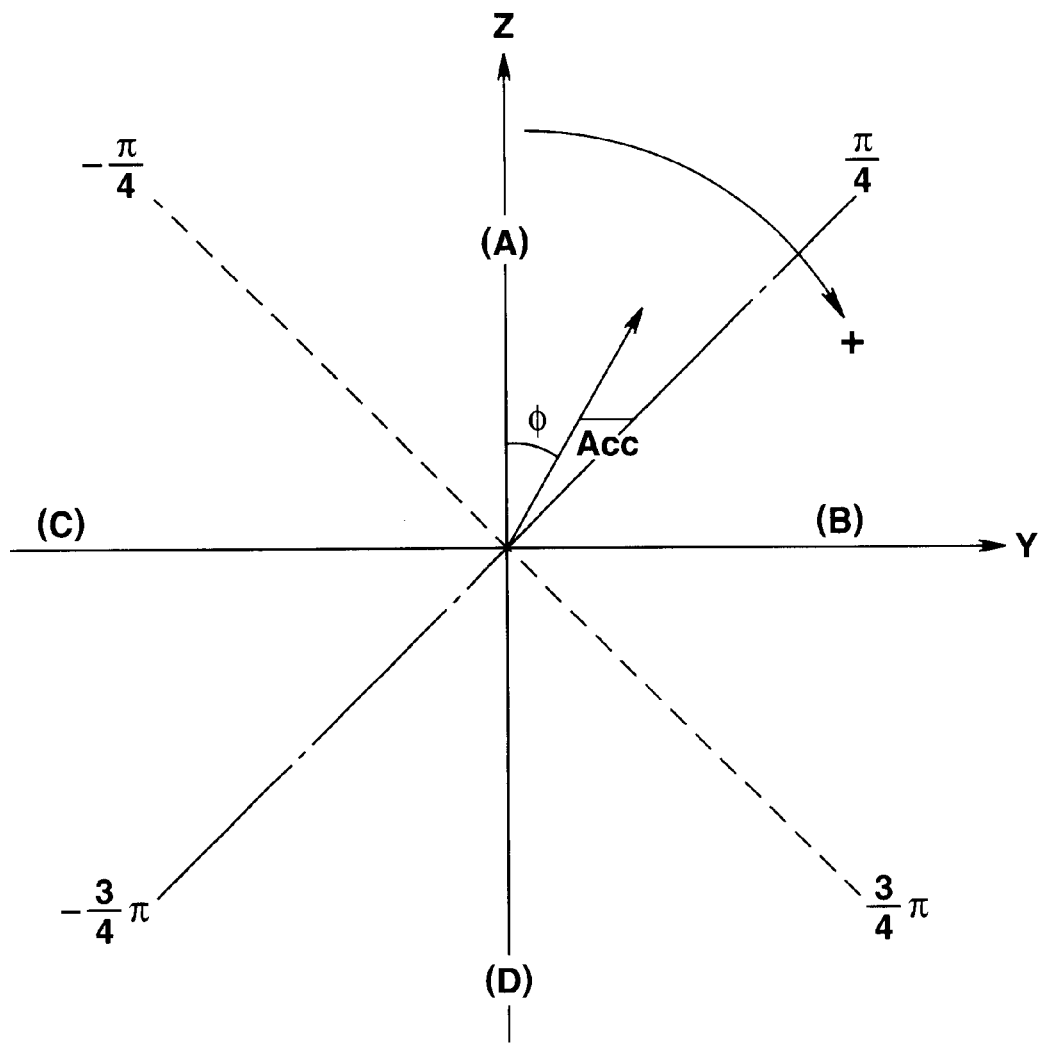
FIG. 11 is a schematic illustration of the relationship of the tumbling direction during a walk and the angle $\phi$ that is defined as a function of the shape-related restrictive conditions of the multi-legged walkable robot of FIG. 1.
Figure 12A:
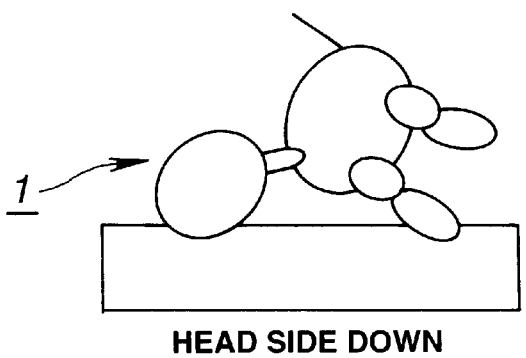
FIGS. 12A, 12B, 12C and 12D are schematic lateral views of the multi-legged walkable robot of FIG. 1, illustrating various falling postures that can occur when the robot is walking.

In the processing operation for restoring the normal posture, firstly the falling direction is determined on the basis of the argument $\theta$ of the average acceleration Acc and the Y-Z plane and the angle $\phi$ of the component of the average acceleration projected on the Y-Z plane and the Z-axis. The multi-legged walkable robot 1 can fall only in one of the four directions of (A), (B), (C), (D) in FIG. 11 because of its shape. Therefore, it is determined if the robot is falling forward (head side down) as shown in FIG. 12A by means of formula $$0 < \phi < (\tfrac{1}{4})\pi \text{ or } -(\tfrac{1}{4})\pi < \phi < 0 \quad \text{(formula 16)}.$$

Figure 12B:
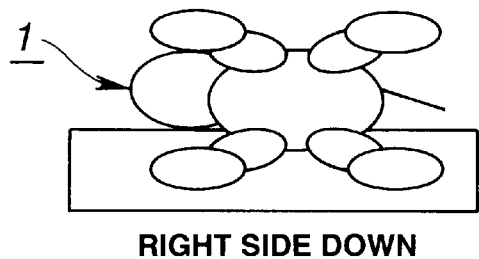

Then, control section 100 determine if the robot is falling rightward (right side down) as shown in FIG. 12B by means of formula $$(\tfrac{1}{4})\pi < \phi < (\tfrac{3}{4})\pi \quad \text{(formula 17)}.$$

Figure 12C:
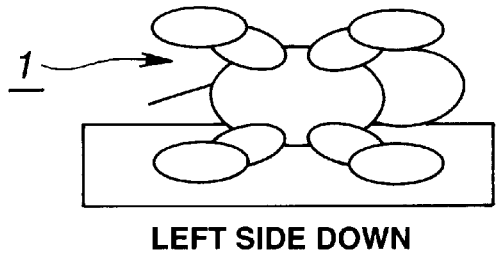

Then, the control section 100 determines if the robot is falling leftward (left side down) as shown in FIG. 12C by means of formula $$-(\tfrac{1}{4})\pi > \phi > -(\tfrac{3}{4})\pi \quad \text{(formula 18)}.$$

Figure 12D:
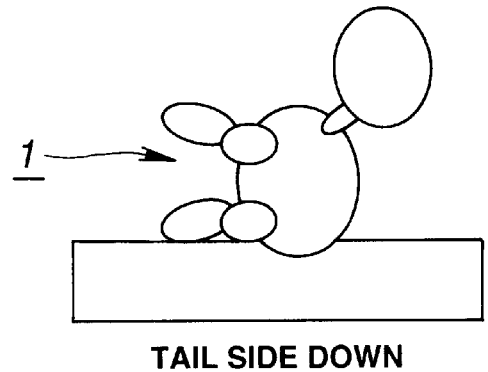

Finally, the control section 100 determines if the robot is falling rearward (tail side down) as shown in FIG. 12D by means of formula $$(3/4)\pi < \phi \text{ or } \phi > -(3/4)\pi \qquad \text{(formula 19)}.$$

Thereafter, the control section 100 restores the normal posture of the robot from the falling posture, which is one of the four postures (head side down, right side down, left side down, tail side down) stored in the memory 101 in advance by means of a play back technique using route planning data. However, there may be occasions where the falling posture of the robot is changed while restoring the normal posture. For example, a head side down posture may be changed to a right or left side down posture while the control section 100 is restoring the normal posture of the robot. Then, the current restoring operation is terminated quickly and the process of detecting the falling posture and restoring the normal posture will be repeated to make the robot restore the normal posture quickly.

Figure 13:
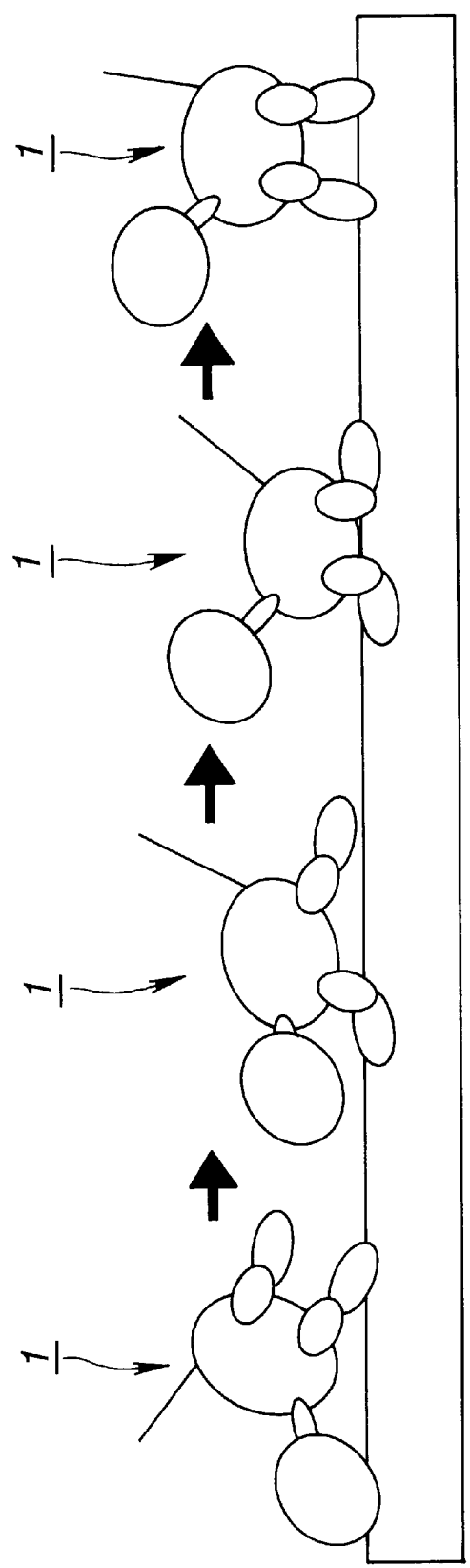
FIG. 13 is schematic lateral view of the multi-legged walkable robot of FIG. 1, illustrating how it restores the normal posture from a falling posture.

FIG. 13 is schematic lateral view of the multi-legged walkable robot 1, illustrating how it restores the normal posture from a head side down posture.

Route planning data for restoring the normal posture from the head side down posture of the robot can be generated for the operator by instructing the multi-legged walkable robot 1 about the relative positional relationship of the right foreleg 3, the left foreleg 4, the right hind leg 5 and the left hind leg 6 by means of a direct teaching method so that the generated route planning data may be stored in the memory 101.

While the control section 100 determines the falling posture of the multi-legged walkable robot 1 on the basis of the acceleration information obtained by the 3-axial (x, y, z) acceleration sensor 41 contained in the main body 2 and restores the normal posture of falling posture, which is one of the four postures (head side down, right side down, left side down, tail side down) stored in the memory 101 in advance in the above description, it may alternatively be so arranged that the control section 100 determines the falling posture of the robot by means of an angular velocity sensor, an angular acceleration sensor or an inclination sensor that can also be contained in the main body 2 for the operation of restoring the normal posture of the robot. Still alternatively, it may be so arranged that the control section 100 combines the outputs of more than one different sensors to determine the falling posture of the robot before restoring the normal posture of the robot.

If the multi-legged walkable robot is four-legged, an abnormal posture of the robot can be detected by comparing the posture models stored in the inside and the outputs of the contact sensors arranged at the tips of the legs and at various positions of the main body.

Figure 14:
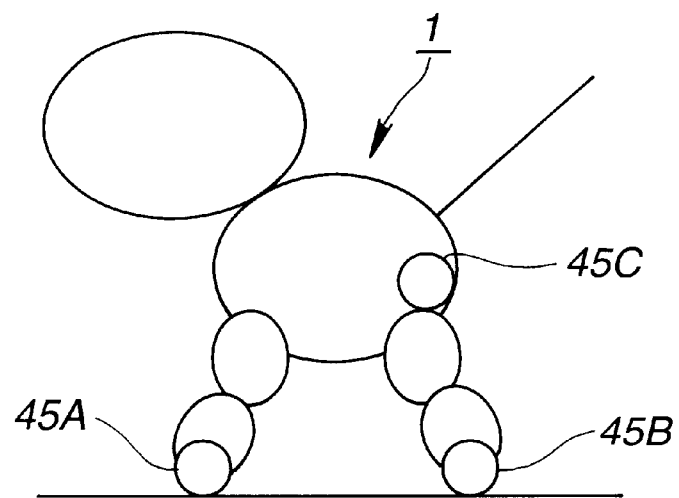
FIG. 14 is a schematic illustration of the multi-legged walkable robot of FIG. 1, showing how it detects its contact with a foreign object by means of its contact sensor when it is standing.
Figure 15:
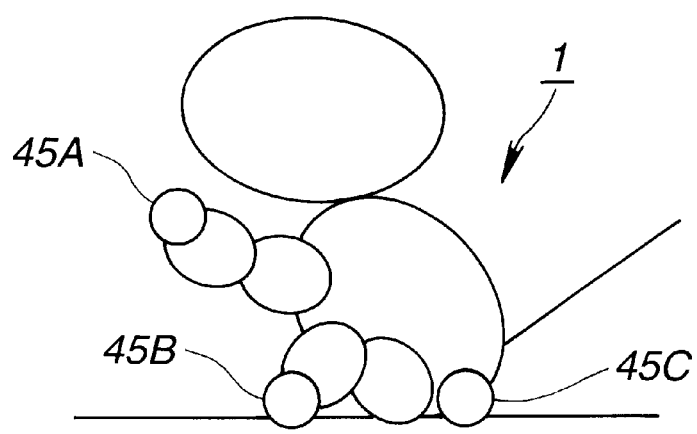
FIG. 15 is a schematic illustration of the multi-legged walkable robot of FIG. 1, showing how it detects its contact with a foreign object by means of its contact sensor when it is sitting.

For example, if the robot is standing as shown in FIG. 14, only the contact sensors 45A, 45B arranged at the tips of the legs detect a contact condition out of the contact sensors 45A, 45B, 45C. However, if the robot is sitting and trying to use the forelegs as shown in FIG. 15, the contact sensors 45 arranged at the tips of the hind legs and the contact sensor 45C arranged at the sitting detect a contact condition. Therefore, if the postures of the robot and the ideal conditions of the contact sensors 45 are stored in the memory of the robot main body 2 in advance, an abnormal posture can be detected by comparing the outputs of the contact sensors 45 and the stored data when the robot is taking any of the stored posture.

In the case of a robot apparatus comprising an image input device, an abnormal posture can be detected by recognizing the ground surface by means of the image input device and determining the correlation of the ground surface condition and the posture that the robot is trying to take.

Figure 16:
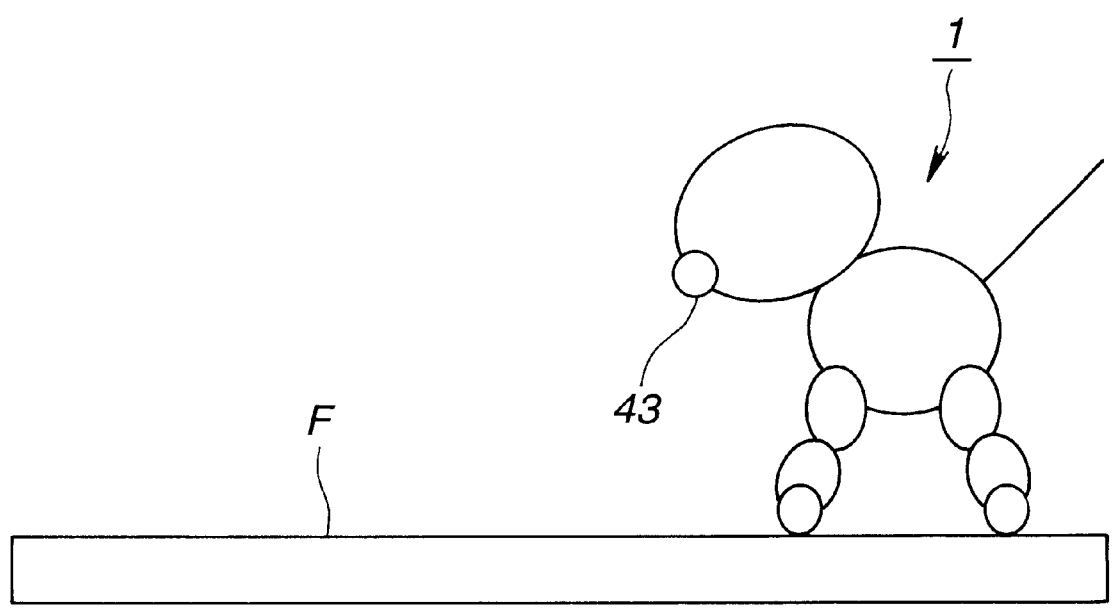
FIG. 16 is a schematic lateral view of the multi-legged walkable robot of FIG. 1, illustrating how it takes in video information by means of a CCD camera when it is standing.
Figure 17A:
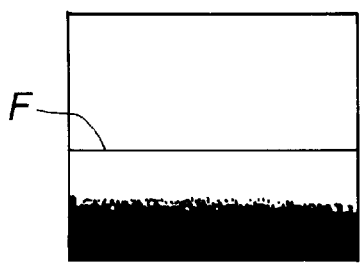
FIGS. 17A, 17B, 17C and 17D are schematic illustrations of the pieces of video information that the multi-legged walkable robot of FIG. 1 takes in by means of a CCD camera when it is standing.
Figure 17B:
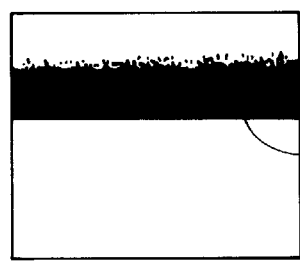
Figure 17C:
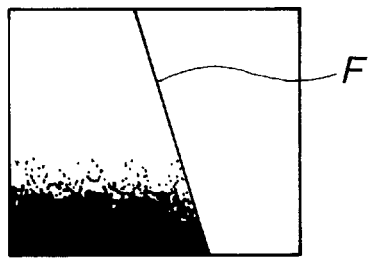
Figure 17D:
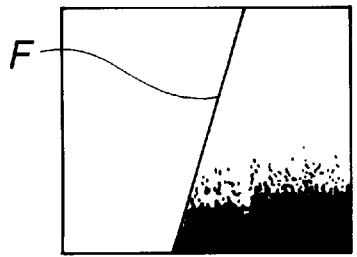

More specifically, when such a multi-legged walkable robot 1 takes a normal posture as shown in FIG. 16, the CCD camera 43 of the image input device picks up an image as shown in FIG. 17A where the floor surface F shows a horizontal line. However, when the robot 1 takes an abnormal posture, the CCD camera 43 may picks up an image as shown in FIG. 17B where the floor surface F is turned upside down or an image as shown in FIG. 17C or 17D where the for surface F is inclined. Thus, an abnormal posture can be detected by judging the state of the floor surface F obtained as output of the CCD camera 43.

Figure 18:
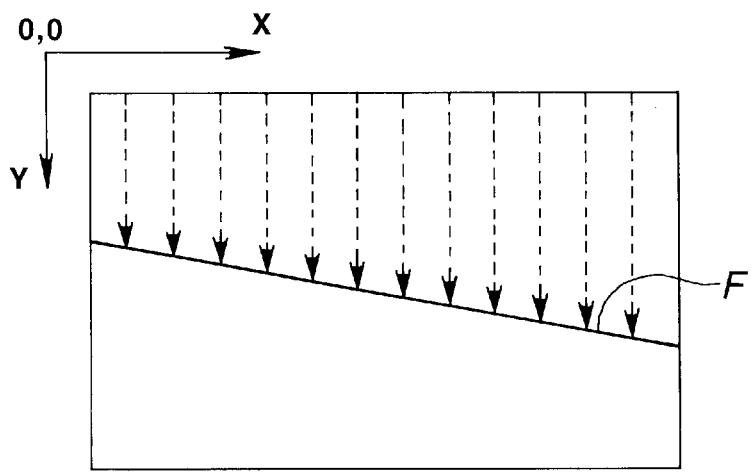
FIG. 18 is a schematic illustration of the floor condition as determined by the multi-legged robot of FIG. 1 on the basis of the video information taken in by means of a CCD camera.

For judging the state of the floor surface F, the operation of detecting the end of the coordinate system of the image in the Y-direction may be repeated as shown in FIG. 18 to define a line by means of the coordinate values obtained from the repeated detecting operation and determine the lateral edges of the floor surface F. Similarly, the operation of detecting the end of the coordinate system of the image in the X-direction may be repeated as shown in FIG. 18 to define a line by means of the coordinate values obtained from the repeated detecting operation and determine the longitudinal edges of the floor surface F. Then, a line defining showing inclined floor surface can be obtained by combining them.

In the case of a tired type robot that uses wheels for moving, the wheels have to be constantly held in contact with the floor surface when it is operating so that an abnormal posture can be detected in a manner as described below.

Figure 19:
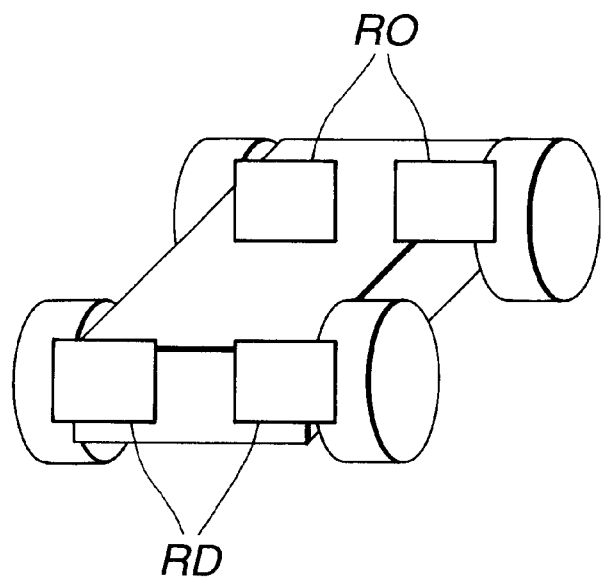
FIG. 19 is a schematic perspective view of a tired type robot apparatus comprising a rotary motion detecting device as abnormal posture detection means.
Figure 20:
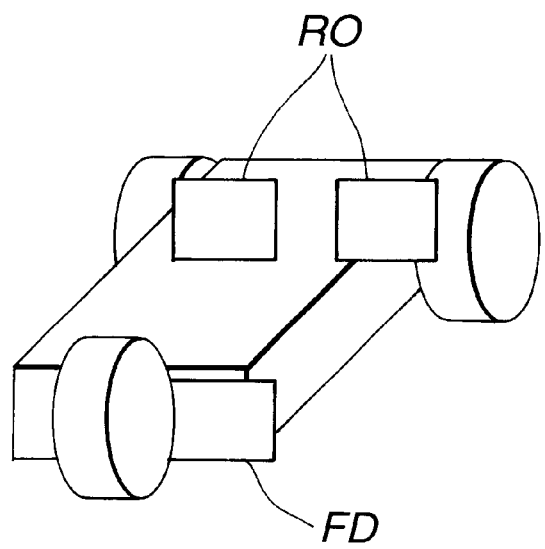
FIG. 20 is a schematic perspective view of a tired type robot apparatus comprising a floor surface detecting device as abnormal posture detection means.
Figure 21:
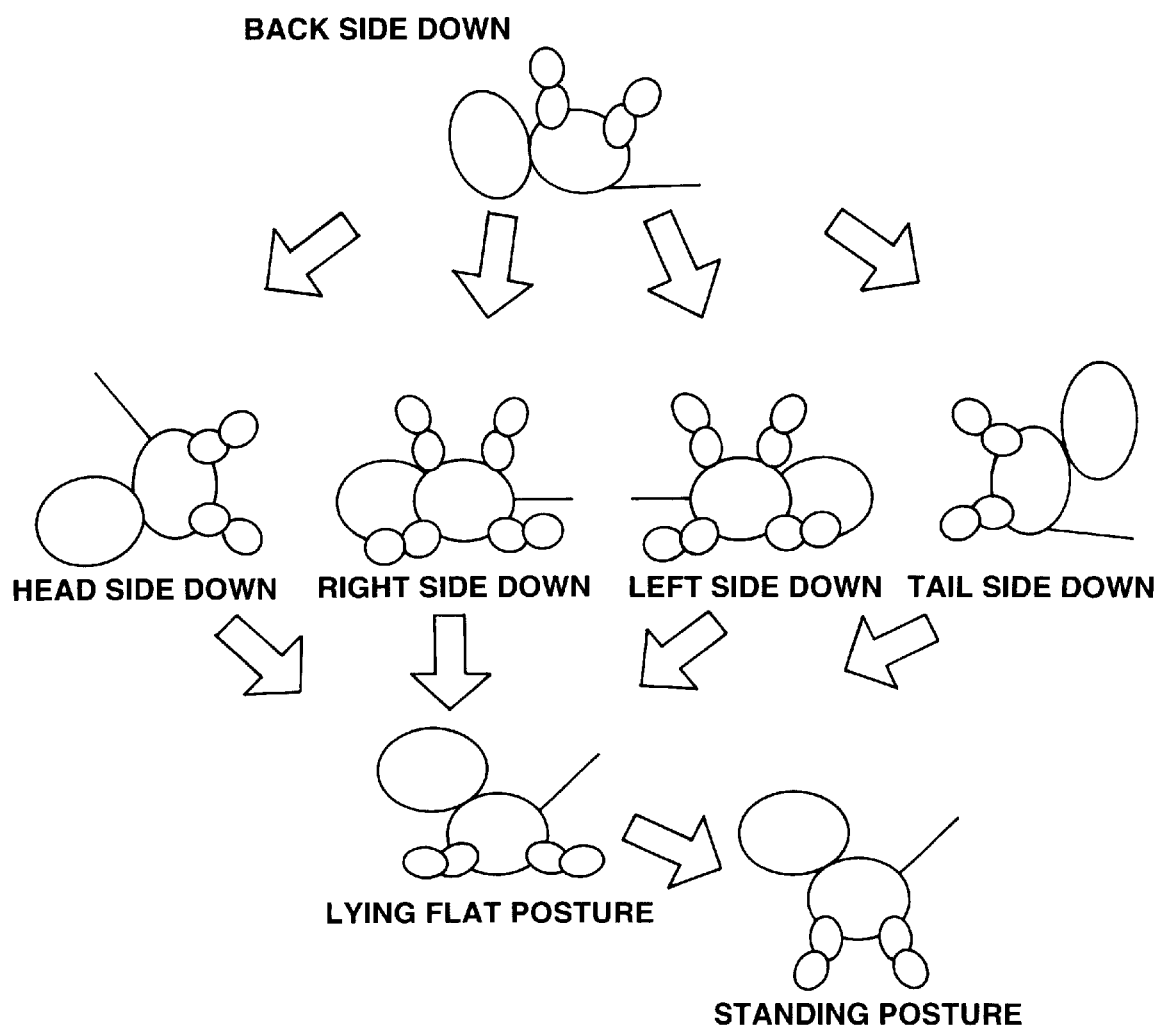
FIG. 21 is schematic views of the multi-legged walkable robot of FIG. 1, illustrating how it restores its normal posture from a state of falling on its back.

For example, an abnormal posture can be detected by detecting the number of revolutions per unit time of each of the follower shafts by means of so may revolution detectors RD and comparing it with the number of revolutions per unit time of each of the rotary output devices RO as shown in FIG. 19.

Alternatively, an abnormal posture can be detecting by mans of a floor surface detector FD particularly the robot is tumbled. For the floor surface detector FD, a non-contact type sensor comprising a light emitting device and a light receiving device or a contact type sensor such as a microswitch may suitable be used.

If the normal posture is restored from a falling posture by means of a playback technique, the motion of restoring the normal posture from the falling posture may be limited to certain state transitions depending on the profile of the robot apparatus. In the case of a multi-joint type robot 1 such as a four-legged robot, there can exist a total of six states including the above listed four falling postures (head side down, right side down, left side down, tail side down), a back side down state where the robot is turned upside down and a stomach side down state where the robot lies flat on the floor. Then, the motion of restoring the normal posture from a falling posture proceeds by way of a stomach side down state. The motion of restoring the normal posture from a back side down state has to proceeds by way of one of the four falling postures (head side down, right side down, left side down, tail side down) before getting to the stomach side down state. Therefore, motion data for the play back technique may be prepared for each of the normal posture restoring motions that the robot can take so that the data for a particular restoring motion can be retrieved by detecting and determining the falling posture. Then, if the robot fell for an unexpected external disturbance, the right restoring motion can be immediately selected and performed. It will be appreciated that the operation of preparing motion data can be simplified with this arrangement of dividing a restoring motion into component motions.

If the above arrangement is not used and if motion data are prepared retrieved for the entire motion of restoring the normal posture from a back side down state, the following problems arise.

1. If the posture of the robot is forcibly restored to the normal posture by external force, the robot cannot start the next motion until the ongoing restoring motion is completed.
2. If the motion data for restoring the normal posture are prepared to proceed by way of the left side down state and the robot is forced to proceed by way of some other state (e.g., by way of the right side down state) due to an external factor (e.g., a projection on the floor surface), the intended normal posture restoring motion becomes abortive and the operation turns out inutile.
3. If the current falling posture is changed while the restoring motion is going on and the ongoing operation is suspended to start a new motion, the joints may have to subjected to a large load because of the disrupted motion.

As described above in detail, a robot apparatus according to the invention can restore the normal posture from an abnormal posture by itself by detecting the posture of the apparatus main body, determining if the apparatus main body is taking a predetermined posture or not on the basis of the result of the detection and modifying the posture of the apparatus main body when it is determined that the apparatus main body is taking the predetermined posture.

Therefore, the present invention provides a robot apparatus that can restore the normal posture from an abnormal posture by itself.

Thus, since a robot apparatus according to the invention can restore the normal posture from an abnormal posture by itself, the robot apparatus is prevented from being damaged or causing an accident if operated in an abnormal posture such as a falling posture. Additionally, a robot apparatus according to the invention can effectively alleviate the workload of the operator for restoring the normal posture of the robot.

What is claimed is:

1. A robot apparatus characterized by comprising:
    posture detection means for detecting a posture of an apparatus main body and outputting a result of said detection;
    posture determination means for determining whether said apparatus main body is taking a predetermined posture or not on the basis of said result of said detection; and
    posture modification means for modifying said posture of said apparatus main body when said posture determination means determines that said apparatus main body is taking said predetermined posture.

2. The robot apparatus according to claim 1, characterized in that
    said posture detection means is a sensor and
    said posture modification means modifies said posture on the basis of and according to said result of said determination of said posture determination means.

3. The robot apparatus according to claim 2, characterized in that said predetermined posture determined by said posture determination means is a falling posture of said apparatus main body.

4. The robot apparatus according to claim 3, characterized in that said falling posture is at least a head side down posture, a tail side dozen posture, a right side down posture or a left side down posture.

5. The robot apparatus according to claim 2, characterized in that said sensor is an image recognition sensor.

6. The robot apparatus according to claim 2, characterized in that said sensor is a contact sensor.

7. The robot apparatus according to claim 6, characterized in that
    said apparatus main body has walking means; and
    said sensor is arranged near the bottom surface of said walking means.

8. The robot apparatus according to claim 2, characterized in that
    said sensor is an acceleration sensor; and
    said posture determination means determines said apparatus main body is taking a predetermined posture at least the output level of said acceleration sensor and/or the direction of acceleration determined from the output of said acceleration sensor.

9. The robot apparatus according to claim 8, characterized in that said predetermined posture determined by said posture determination means is a falling posture of said apparatus main body.

10. The robot apparatus according to claim 9, characterized in that said falling posture is at least a head side down posture, a tail side down posture, a right side down posture or a left side down posture.

11. The robot apparatus according to claim 2, characterized by further comprising:
    memory means storing information on posture modifying motions to be selectively used according to said posture of said apparatus main body; and
    read means for reading out said information on posture modifying motions from said memory means;
    said posture modification means modifies said posture of said apparatus main body according to said read out information on posture modifying motions.

12. The robot apparatus according to claim 11, characterized in that
    said memory means stores information on a plurality of posture modifying motions; and
    said read means reads out said information on said posture modifying motion corresponding to the result of said determination of said posture determination means.

13. The robot apparatus according to claim 12, characterized in that said result of said determination of said posture determination means is said falling posture of said apparatus main body.

14. The robot apparatus according to claim 13, characterized in that said falling posture is at least a head side down posture, a tail side down posture, a right side down posture or a left side down posture.

15. A method of controlling a posture of a robot apparatus, characterized by comprising steps of:
    detecting said posture of an apparatus main body;
    determining whether said apparatus main body is taking a predetermined posture or not on the basis of a result of said detection; and
    modifying said posture of said apparatus main body when it is determined that said apparatus main body is taking said predetermined posture.

* * * * *

UNITED STATES PATENT AND TRADEMARK OFFICE
CERTIFICATE OF CORRECTION

PATENT NO. : 6,330,494 B1  
DATED : December 11, 2001  
INVENTOR(S) : Takashi Yamamoto Page 1 of 1

It is certified that error appears in the above-identified patent and that said Letters Patent is hereby corrected as shown below:

<u>Column 12, claim 4,</u>  
Line 3, replace "dozen" with -- down --.

Signed and Sealed this

Twenty-sixth Day of March, 2002

Attest:

Attesting Officer

JAMES E. ROGAN  
Director of the United States Patent and Trademark Office